United States Patent Office 2,778,850
Patented Jan. 22, 1957

2,778,850

BIS(TRIFLUOROETHYL) FUMARATE

John T. Barr, Neshaminy, and Francis E. Lawlor, Wyndmoor, Pa., assignors to The Pennsylvania Salt Manufacturing Company, Philadelphia, Pa., a corporation of Pennsylvania No Drawing. Application September 29, 1955, Serial No. 537,576

3 Claims. (Cl. 260—485)

This invention relates to a novel fluorinated diethyl ester of fumaric acid. More particularly, it relates to bis(trifluoroethyl) fumarate, and to a process for its preparation.

It is an object of this invention to provide a novel compound which is useful as a monomer for the preparation of highly fluorinated polymers containing a carboxylic ester structure and possessing superior physical and chemical stability. Copolymers and the copolymerization of this novel compound with 2,2,2-trifluoroethyl vinyl ether are among the subjects of copending application Serial No. 518,929 filed June 29, 1955.

The novel compound bis(trifluoroethyl) fumarate is prepared by reacting fumaryl chloride with 2,2,2-trifluoroethanol in approximately stoichiometric quantity at a temperature in the range of 10 to 150° C. for from 0.25 to 60 hours, separating and recovering the product.

In a preferred embodiment of my invention the compound bis(trifluoroethyl) fumarate is prepared by mixing 1 part of fumaryl chloride with about 2 parts of 2,2,2-trifluoroethanol in a reactor, heating the mixture to from 60 to 100° C., for from 4 to 24 hours separating the reaction mixture, filtration being a preferred means, recovering the filtrate, and recovering the bis(trifluoroethyl) fumarate from the filtrate, solvent extraction followed by crystallization from the solvent being a preferred means. The process may be carried out either batchwise or in a continuous manner. Chloroform is a preferred solvent for the extraction step; however, other solvents may readily be used, such as other chlorinated solvents, carbon tetrachloride, for example, benzene, alcohols, and ketones, among others commonly used in the art.

The bis(trifluoroethyl) fumarate is a solid white material at room temperature and in its purified state melts at 39.5° C. It is readily soluble in organic solvents such as chloroform, carbon tetrachloride, benzene, alcohols or ketones.

Bis(trifluoroethyl) fumarate possesses characteristics desirable in a polymerizable organic compound, i. e. it contains at least one ethylenic linkage; it is a solid at room temperatures, which is helpful in reducing handling losses and fire hazards encountered with the commonly used highly volatile liquid monomers and gases, and it can readily be prepared from easily available raw materials.

The presence of the many fluorine atoms in the structure is a useful and valuable characteristic, making the compound highly stable and resistant to chemical oxidation.

The invention is further illustrated by reference to the following specific examples:

Example 1

A mixture of 230 g. (1.5 moles) of fumaryl chloride and 310 g. (3.1 moles) of 2,2,2-trifluoroethanol was heated at 85° C. for 4 hours and allowed to stand overnight. The partly crystalline mass was filtered and the filtrate recovered. The filtrate was dissolved in 225 grams of chloroform and cooled. 362 g. of white crystals, M. P. 37.5°–38.5° C., were recovered. A small portion of the crystals was dissolved in chloroform and the solution was washed with a 5% sodium carbonate solution, dried and cooled to yield glistening white platelets which melted sharply at 39.5° C.

Example 2

A glass reactor vessel was charged with 10 parts each of 2,2,2-trifluoroethyl vinyl ether and bis(trifluoroethyl) fumarate, and a solution of 0.5 parts K₂S₂O₈ and 1.0 part Triton X–100 in 50 parts H₂O. The vessel was rotated 19 hours at 50° C. After opening the vessel, the solids were coagulated by a sodium chloride solution acidified with hydrochloric acid, filtered and dried at 50° C. to give 13.5 parts of a hard thermoplastic resin that could be molded to a strong somewhat flexible sheet, useful in laboratory equipment because of its resistance to chemical oxidation and high stability.

Different embodiments of this invention may be made without departing from the scope and spirit of it and it is understood that our invention includes all such embodiments and is not to be limited by the above description.

I claim:
1. Bis(trifluoroethyl) fumarate.
2. A composition comprising bis(trifluoroethyl) fumarate.
3. A process for the preparation of bis(trifluoroethyl) fumarate which comprises heating a mixture of fumaryl chloride and 2,2,2-trifluoroethanol.

References Cited in the file of this patent

FOREIGN PATENTS 580,665      Great Britain _____ Sept. 16, 1946

OTHER REFERENCES

Mast et al.: Ind. Eng. Chem. 40 (1948), pgs. 107–12.
Filler et al.: J. Am. Chem. Soc. 75 (1953), pgs. 2693–5.